United States Patent [19]
Yamamoto et al.

[11] Patent Number: 5,904,217
[45] Date of Patent: May 18, 1999

[54] SNOWMOBILE

[75] Inventors: Kazuhiro Yamamoto; Takao Kouchi, both of Saitama, Japan

[73] Assignee: Honda Giken Kogyo Kabushiki Kaisha, Tokyo, Japan

[21] Appl. No.: 08/799,222

[22] Filed: Feb. 14, 1997

[30] Foreign Application Priority Data

Feb. 16, 1996 [JP] Japan .................................. 8-053761

[51] Int. Cl.$^6$ .................................................. B62D 55/14
[52] U.S. Cl. .......................... 180/193; 180/190; 305/127
[58] Field of Search ..................... 180/184, 186, 180/193, 191, 192, 190, 9.1, 9.25, 9.26, 9.62, 9.21, 9.56; 305/116, 127, 128, 168

[56] References Cited

U.S. PATENT DOCUMENTS

| | | | |
|---|---|---|---|
| 3,527,505 | 9/1970 | Hetteen ................................... | 180/193 |
| 3,545,821 | 12/1970 | Erickson .................................. | 180/193 |
| 3,554,310 | 1/1971 | Dieffenbach ............................ | 305/127 |
| 3,719,242 | 3/1973 | Duclo ...................................... | 180/193 |
| 3,721,308 | 3/1973 | Brandli et al. .......................... | 180/193 |
| 3,887,242 | 6/1975 | Russ, Sr. ................................. | 305/128 |
| 4,093,033 | 6/1978 | Rosch . | |
| 4,301,884 | 11/1981 | Taylor ..................................... | 305/127 |
| 4,305,476 | 12/1981 | Blass et al. .............................. | 305/127 |
| 4,314,618 | 2/1982 | Tamura ................................... | 180/193 |
| 4,518,056 | 5/1985 | Kobayashi .............................. | 180/190 |
| 5,474,146 | 12/1995 | Yoshioka et al. ....................... | 180/190 |
| 5,533,585 | 7/1996 | Kawano et al. ......................... | 180/9.1 |
| 5,568,840 | 10/1996 | Nagata et al. ........................... | 180/190 |
| 5,586,614 | 12/1996 | Kouchi et al. ........................... | 180/9.1 |
| 5,829,545 | 11/1998 | Yamamoto et al. ..................... | 180/193 |

FOREIGN PATENT DOCUMENTS 2-204182  8/1990  Japan ................................... 305/116

*Primary Examiner*—Lanna Mai
*Assistant Examiner*—Michael Cuff
*Attorney, Agent, or Firm*—Birch, Stewart, Kolasch & Birch, LLP

[57] ABSTRACT

First rear swing arms are pivotably supported at their front ends to a drive shaft on which drive wheels are mounted. The rear ends of the first rear swing arms are pivotably supported through a shaft to the front ends of side rails, and first idlers are mounted on the shaft. Second idlers are mounted on a shaft to which the rear ends of the side rails are supported, and second rear swing arms are supported at their lower ends to shafts supported to the rear ends of the side rails. The upper ends of the second rear swing arms are supported to a shaft supported to a floor. A track belt is wrapped around the drive wheels and the idlers. Sliders and are individually mounted on the first rear swing arms and the side rails, respectively.

20 Claims, 8 Drawing Sheets

SNOWMOBILE

BACKGROUND OF THE INVENTION

1. Field of the Invention

The present invention relates to a snowmobile having a steerable ski supported on a front portion of a vehicle body and an endless track device supported on a rear portion of the vehicle body.

2. Description of Background Art

An endless track device for a snowmobile is disclosed in U.S. Pat. No. 4,093,033. This endless track device includes a drive wheel, a swing arm pivotably supported to a vehicle body, a side rail supported to a rear end of the swing arm and extending in a longitudinal direction of the vehicle body, idlers supported to a front portion and a rear portion of the side rail, and a track belt wrapped around the idlers and the drive wheel. The side rail is formed with a slider extending in the longitudinal direction for slidably guiding the track belt. The front end of the slider extends to a position in the vicinity of the drive wheel.

Further, a rear cushion device consisting of a damper and a cushion spring is provided between the swing arm and the side rail.

When an impact load is applied from a snow surface to the side rail of the endless track device during operation of the snowmobile, the swing arm is swung upwardly. At this time, the front end of the side rail moved upwardly together with the swing arm is gradually separated from a portion of the track belt between the drive wheel and the front idler. Eventually, the swing arm cannot slidably guide the track belt.

SUMMARY AND OBJECTIONS OF THE INVENTION

Accordingly, it is desired to prevent such a problem and allow the track belt to be always stably guided.

According to the present invention, a snowmobile is provided which includes an endless track device having a drive wheel supported on a vehicle body, a swing arm pivotably supported at a front end thereof to the vehicle body, a side rail connected through a shaft to a rear end of the swing arm and extending in a longitudinal direction of the vehicle body, first and second idlers supported to at least a front portion and a rear portion of the side rail, and a track belt wrapped around the first and second idlers and the drive wheel. The improvement includes sliders for slidably guiding the track belt which are provided individually on the swing arm and the side rail.

In this configuration, laterally opposite end portions of the track belt may be formed as inclined portions inclined so as to gradually be displaced come away from a snow surface. Further, a sliding portion of each of the sliders relative to the track belt may comprise a portion normally kept in sliding contact with the inclined portions of the track belt and a portion adapted to temporarily come into sliding contact with the inclined portions in a bank condition of the vehicle body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the present invention will be described with reference to the drawings.

Figure 1:
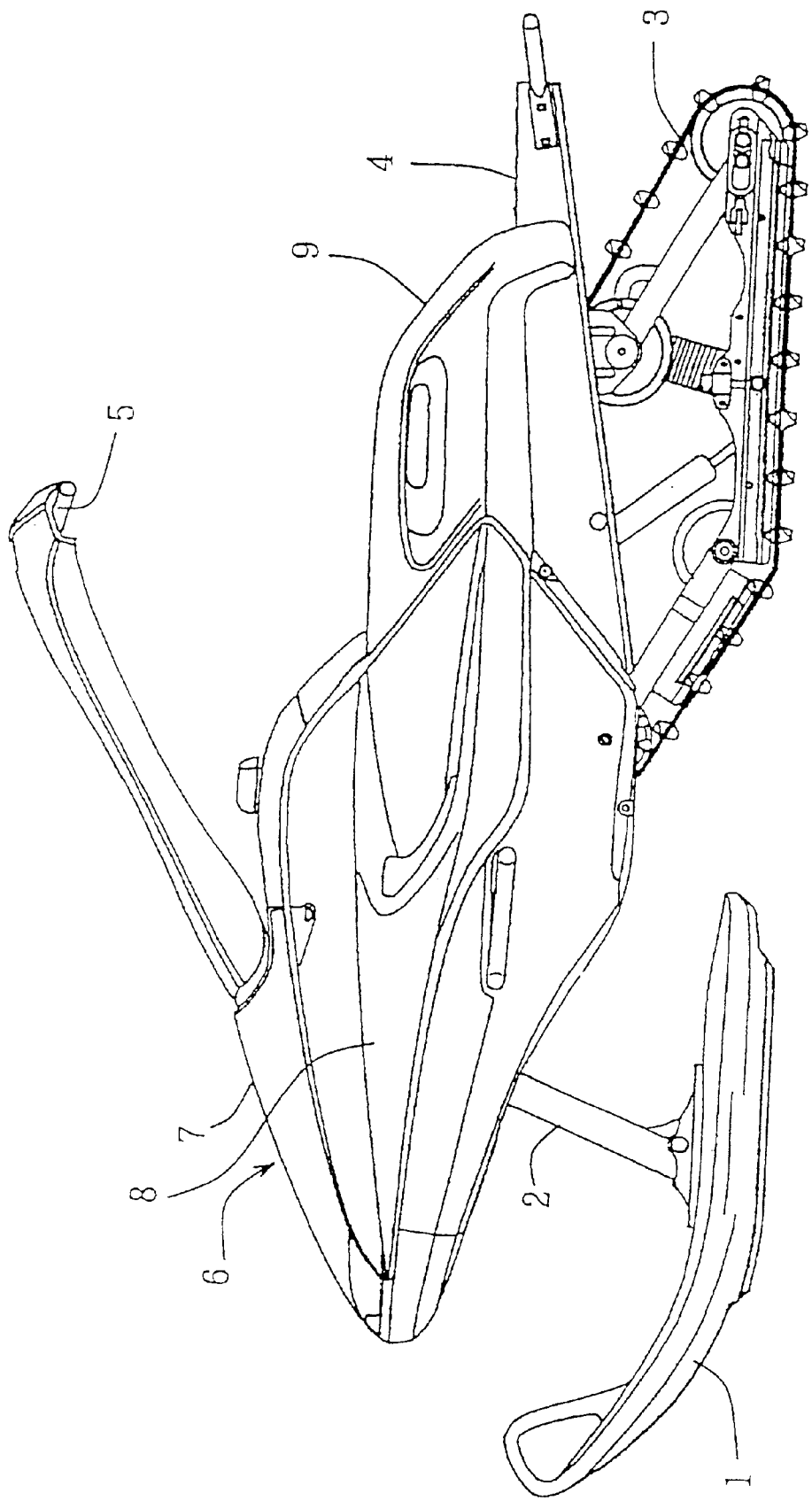
FIG. 1 is a side view of a snowmobile according to the present invention.
Figure 2:
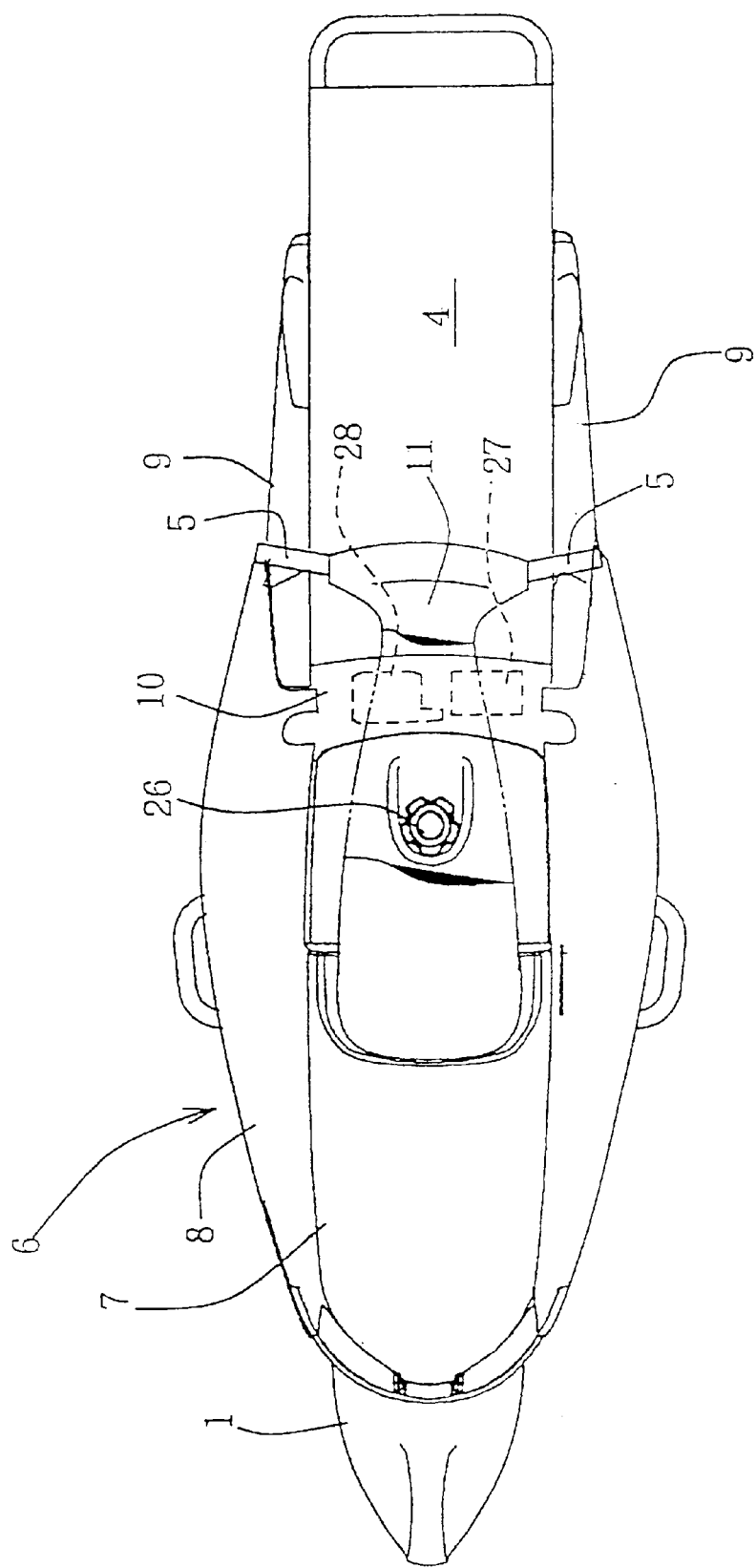
FIG. 2 is a top plan view of the snowmobile.

As illustrated in FIGS. 1 and 2, a steerable ski 1 is supported through a front suspension 2 to a front portion of a vehicle body of the snowmobile, and an endless track device 3 is provided at a rear portion of the vehicle body. The endless track device 3 is driven by the rotation of an engine to be hereinafter described. A floor 4 is provided above the endless track device 3, and handlebars 5 are operated by an operator standing on the floor 4.

The front portion of the vehicle body is covered with a body cover 6. The body cover 6 is composed of a front cover 7 elongated in the longitudinal direction for covering an upper central portion of the vehicle body and a side cover 8 for covering opposite side portions of the vehicle body.

Figure 3:
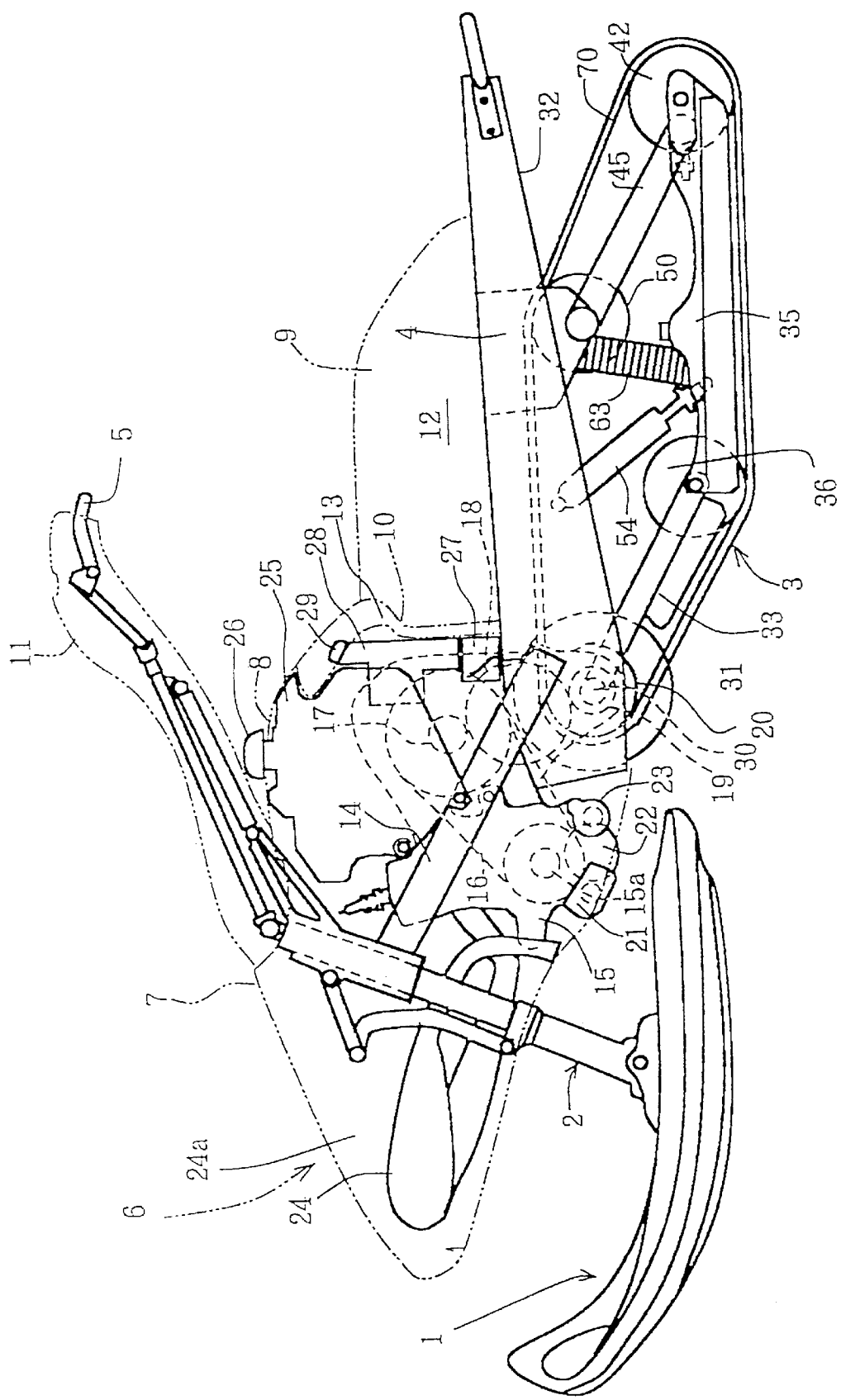
FIG. 3 is a side view of the snowmobile with a vehicle body cover removed.

As illustrated in FIGS. 2 and 3, a pair of rear portions 9 of the side cover 8 extend along the right and left sides of the floor 4. In FIGS. 2 and 3, a lid 10, and a handle cover 11 are provided on the vehicle body.

As illustrated in FIG. 3, the vehicle body is partitioned into an operator space 12 defined above the floor 4 and an engine room 13 defined in front of the operator space 12.

A pair of right and left main frames 14 which extend in the longitudinal direction are provided in the engine room 13. And an engine 15 is supported to the main frames 14. The rotary power of the engine 15 is output from a crankshaft 15a through a belt-type continuous variable transmission 16, and is transmitted through gear trains 17, 18 and 19 to a pair of right and left drive wheels 20 of the endless track device 3.

The engine 15 is provided with an oil pump 21, a balancer 22, and a water pump 23. An exhaust chamber 24a is defined before the engine 15 to accommodate an exhaust pipe 24. The exhaust pipe 24 has an exhaust gas output exposed to the lower side of the body cover 6.

The right and left main frames 14 are welded at their rear end portions to the right and left side surfaces of a front end portion of the floor 4 having a substantially inverted U-shaped cross section.

A fuel tank 25 is supported to an upper portion of the engine 15, and a fuel filler cap 26 of the fuel tank 25 is exposed from an upper central portion of the side cover 8.

The side cover 8 extends from the front end of the vehicle body along the upper side of the fuel tank 25 to the rear side of the fuel tank 25. The rear portion of the side cover 8 covering the rear side of the fuel tank 25 is formed with an opening for maintenance. This opening is closed by the removable lid 10.

A battery 27 and an oil tank 28 are provided inside the lid 10. An oil filler cap 29 of the oil tank 28 is mounted adjacent to the maintenance opening.

The endless track device 3 will now be described in detail. The drive wheels 20 are supported to a drive shaft 30. Brake disks 31 are supported coaxially with the drive shaft 30. With this arrangement of the brake disks 31, the concentration of mass can be ensured, and a sufficient bank angle can also be ensured.

Referring to FIGS. 4 to 8, the floor 4 is a member having a substantially inverted U-shaped cross section, and the drive shaft 30 is supported at its opposite ends to front end portions of right and left side panels 32 of the floor 4.

A pair of right and left, first rear swing arms 33 are parallel to each other and are pivotably connected at their front ends to a central portion of the drive shaft 30.

The first rear swing arms 33 extend rearwardly so as to be inclined downwardly. The rear ends of the first rear swing arms 33 are pivotably connected to a first idle shaft 34 which is parallel to the drive shaft 30.

The first idle shaft 34 is supported at its opposite ends to front end portions of a pair of right and left side rails 35 extending substantially horizontally in the longitudinal direction. A pair of right and left, first idlers 36 are rotatably supported through bearings 37 to a central portion of the first idle shaft 34.

A second idle shaft 39 is supported at its opposite ends within elongated holes 38 formed at rear end portions of the right and left side rails 35. The longitudinal position of the second idle shaft 39 is adjustable within the elongated holes 38 by an adjusting member 40.

A pair of right and left, second idlers 42 are rotatably supported through bearings 41 to a central portion of the second idle shaft 39.

A pair of right and left, pivot shafts 43 projecting laterally inwardly are mounted on the inner surfaces of the rear end portions of the right and left side rails 35 in the vicinity of the supported portions of the second idle shaft 39. A pair of right and left, second rear swing arms 45 are pivotably supported at their lower ends through bearings 44 to the pivot shafts 43.

Figure 8:
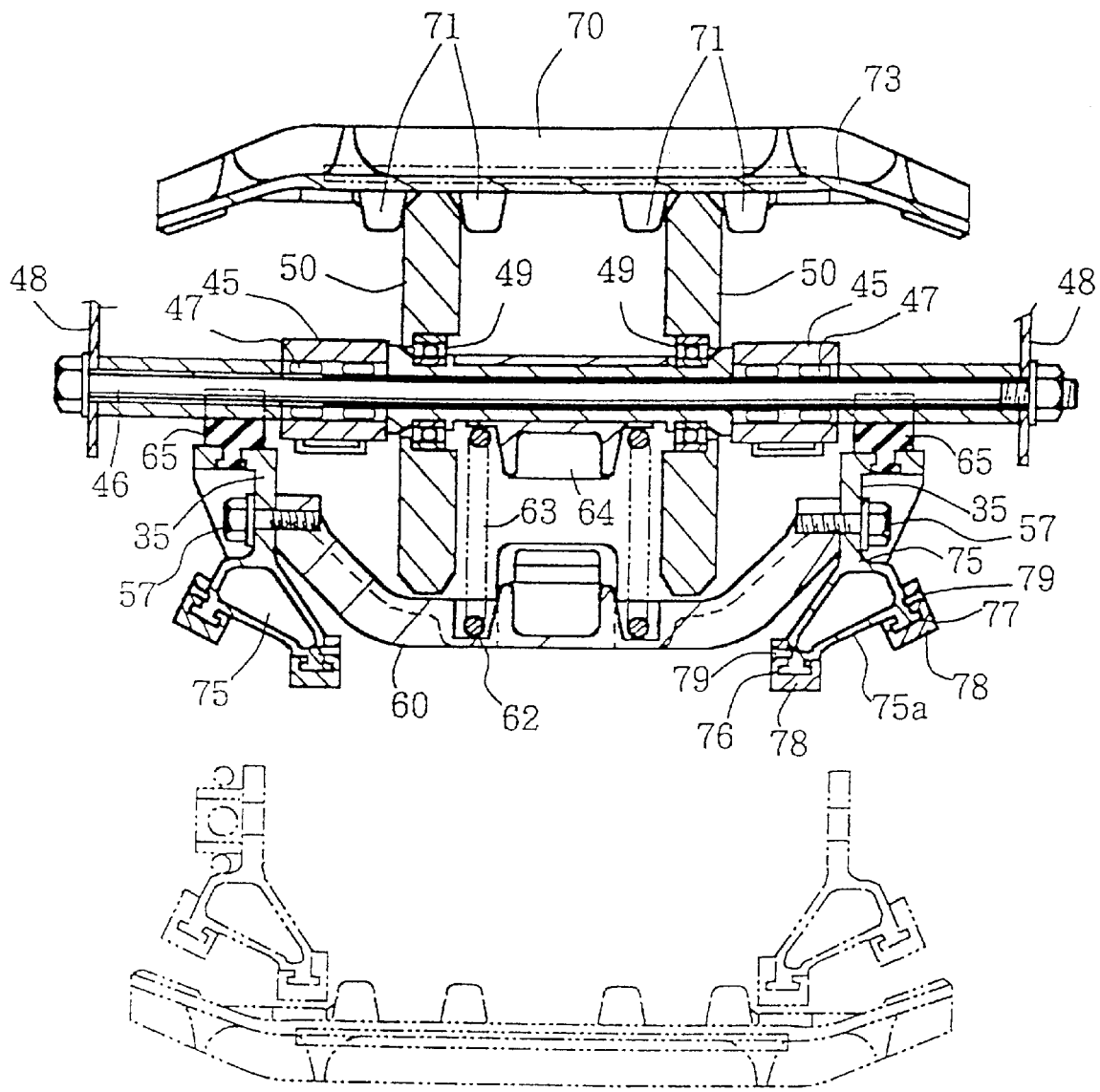
FIG. 8 is a cross section taken along line 8—8 in FIG. 5.

The second rear swing arms 45 are parallel to the first rear swing arms 33. The upper ends of the second rear swing arms 45 are pivotably supported through bearings 47 to a central portion of a third idle shaft 46 parallel to the drive shaft 30, as illustrated in FIG. 8.

The third idle shaft 46 is supported at its opposite ends to a pair of right and left idle brackets 48 projecting downwardly from the lower ends of the right and left side panels 32 at their substantially central portions. A pair of right and left, third idlers 50 are rotatably supported through bearings 49 to a central portion of the third idle shaft 46.

The front end portion of the floor 4 is provided with a pair of right and left cushion brackets 51 projecting rearwardly along the inner surfaces of the right and left side panels 32. A cross pipe 52 extends between the rear ends of the right and left cushion brackets 51.

Figure 7:
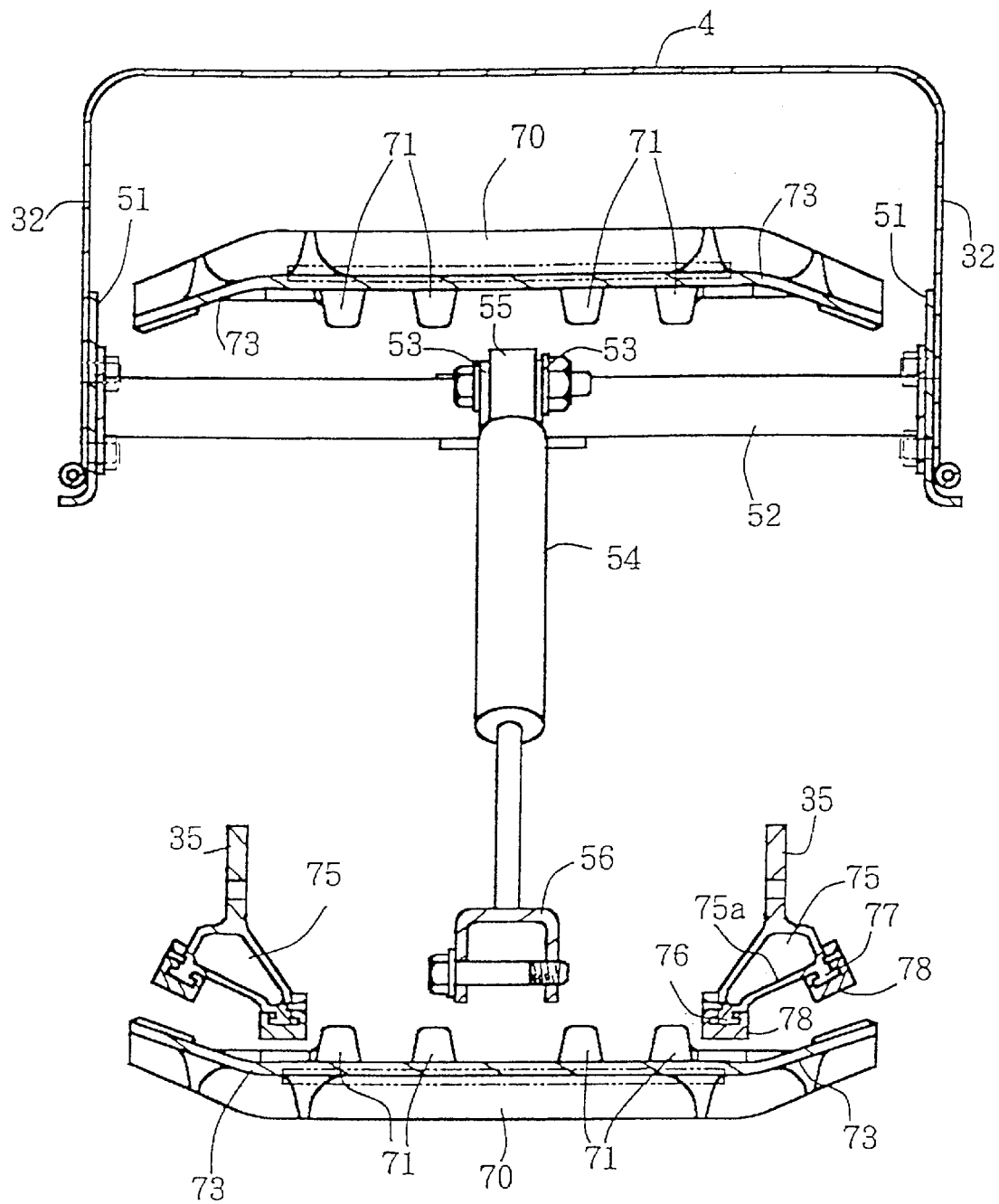
FIG. 7 is a cross section taken along line 7—7 in FIG. 4.

A pair of right and left stays 53 project rearwardly from a central portion of the cross pipe 52. An upper end portion 55 of a rear damper 54 is supported between the rear ends of the right and left stays 53, as illustrated in FIG. 7.

A lower end portion 56 of the rear damper 54 is supported to a stay 61 projecting from a central portion of a cross member 60. The cross member 60 extends between the right and left side walls 35 at their central portions, and is fixedly supported thereto by bolts 57 (see FIG. 6).

A lower spring retaining recess 62 is formed at a central portion of the cross member 60, and the lower end of a cushion spring 63 is retained in the recess 62.

The upper end of the cushion spring 63 is supported to an upper spring retaining member 64 mounted on the third idle shaft 46 at its central portion, as illustrated in FIG. 8.

Figure 4:
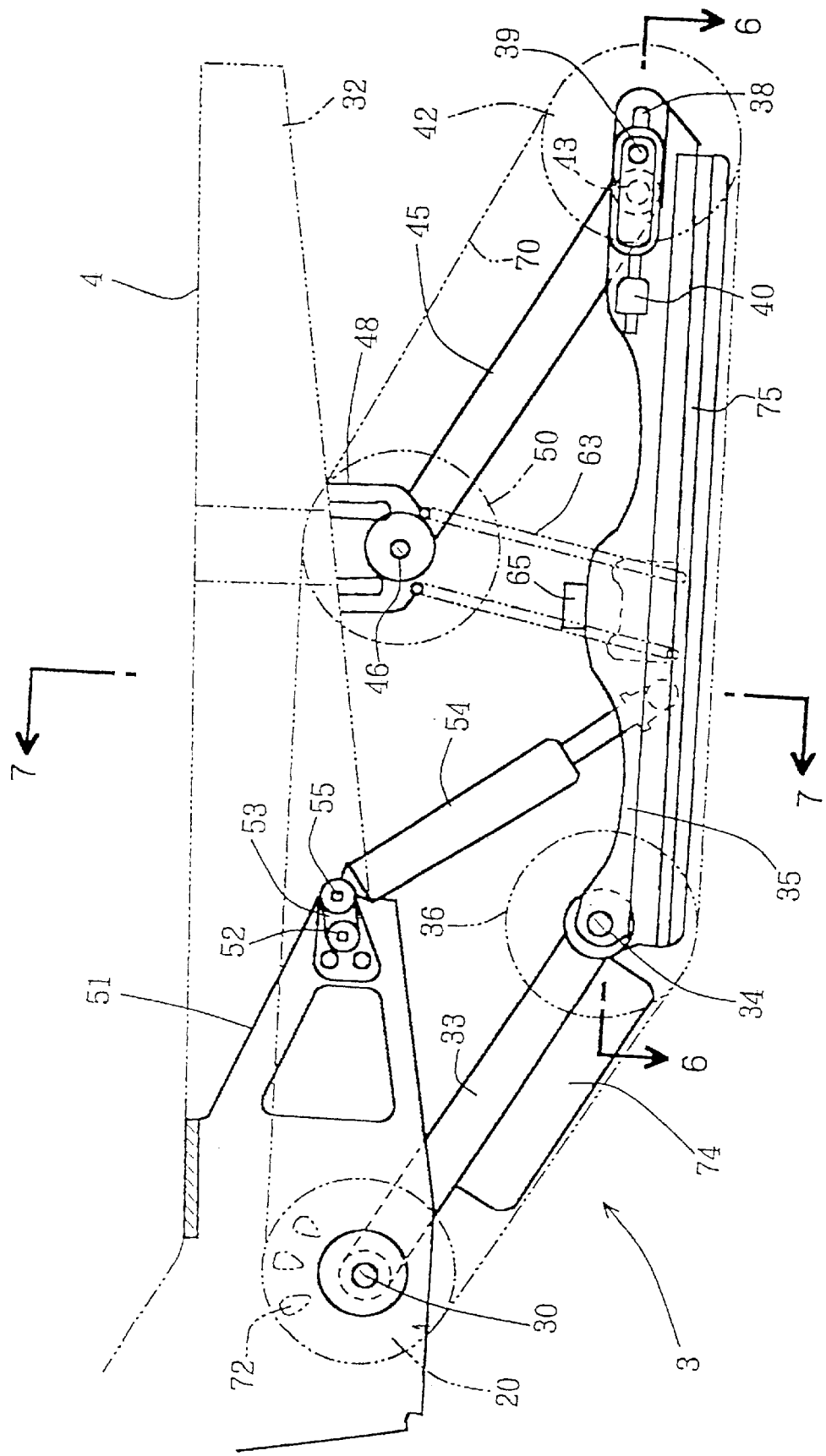
FIG. 4 is a side view of an endless track device in a normal condition according to a preferred embodiment of the present invention.

In the normal condition shown in FIG. 4, the cushion spring 63 is inclined rearwardly so as to form a substantially V-shaped configuration in cooperation with the rear damper 54 inclined forwardly. In the compressed condition shown in FIG. 5, the cushion spring 63 extends substantially upright.

A pair of right and left rubber stoppers 65 are mounted on the upper surfaces of the right and left side rails 35 in the vicinity of the mounted portions of the cross member 60. In the compressed condition shown in FIG. 5, the rubber stoppers 65 abut against the third idle shaft 46 to transmit a reaction force from a snow surface through the side rails 35 directly to the floor 4, as illustrated in FIG. 8.

The endless track device 3 forms a pair of parallelogrammatic links each having four pivotal points located on the drive shaft 30, the first idle shaft 34, the corresponding pivot shaft 43, and the third idle shaft 46. An endless track belt 70 is wrapped around the drive wheels 20, the first idlers 36, the second idlers 42, and the third idlers 50.

The track belt 70 is formed of rubber, and a plurality of teeth 71 project from the inner circumferential surface of the track belt 70. The teeth 71 are arranged in right and left parallel lines in such a manner that the teeth 71 in each line are spaced from each other so as to nip each of the drive wheels 20, the first idlers 36, the second idlers 42, and the third idlers 50 from their opposite sides.

Figure 5:
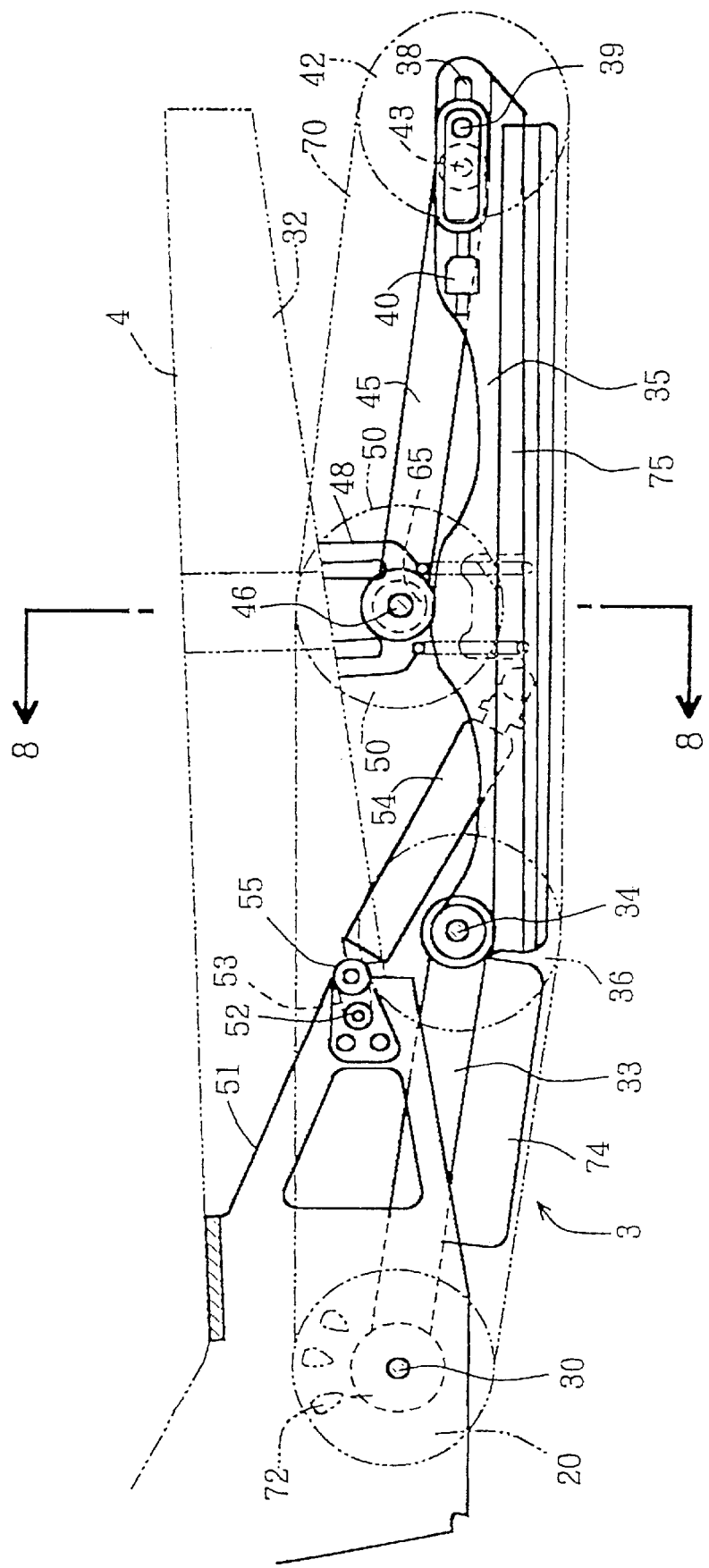
FIG. 5 is a view similar to FIG. 4, showing a high-load condition.
Figure 6:
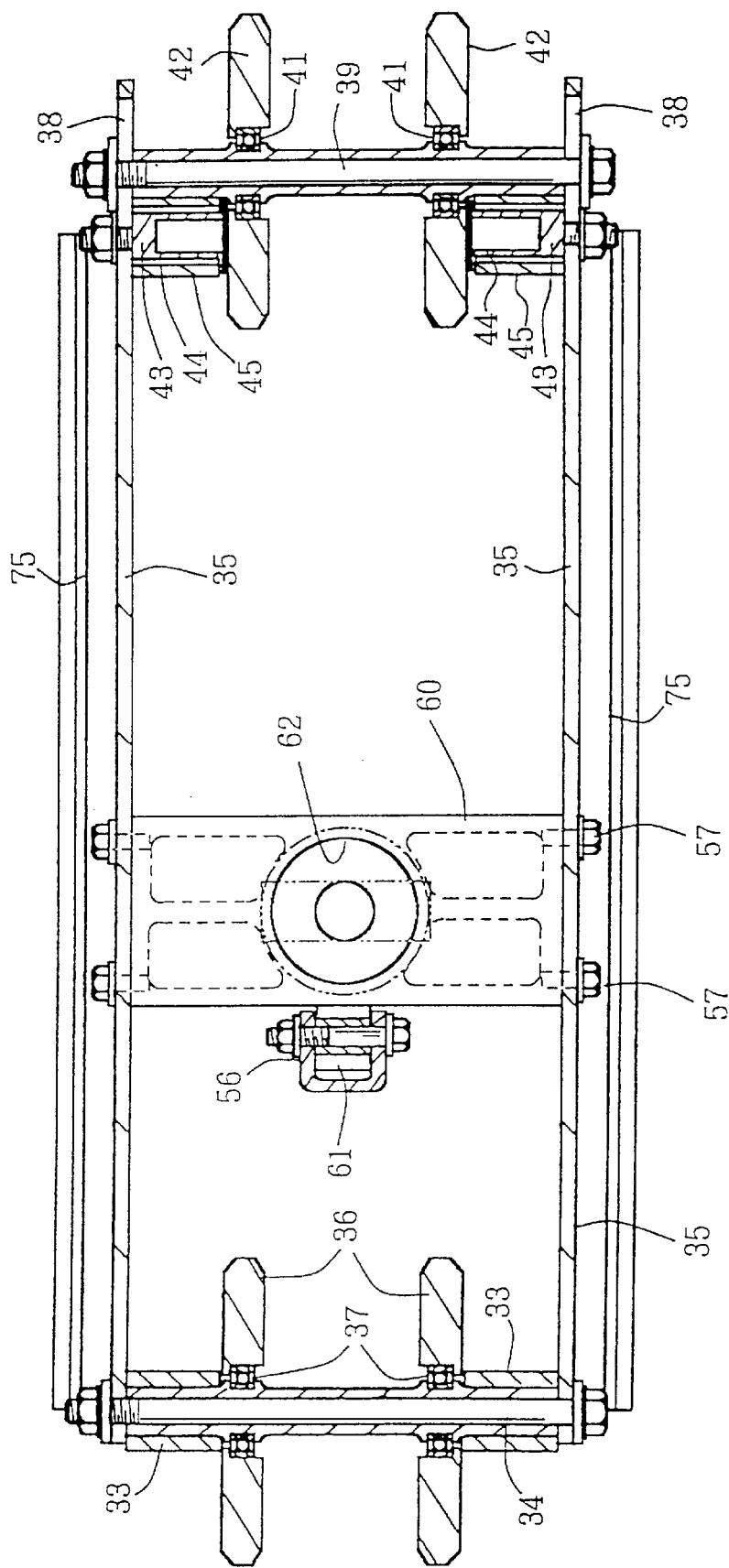
FIG. 6 is a cross section taken along line 6—6 in FIG. 4.

The teeth 71 in each line are in mesh with teeth 72 projecting from opposite side surfaces of each drive wheel 20 which are equally spaced along its circumferential direction, so that the torque of each drive wheel 20 is transmitted to the track-belt 70, as illustrated in FIG. 5.

As illustrated in FIGS. 7 and 8, the track belt 70 is composed of a horizontal portion having teeth 71 and a pair of right and left inclined portions 73 bent inwardly from the laterally opposite ends of the horizontal portion so as to gradually be displaced from the snow surface on the lower portion of the track belt 70.

A pair of right and left, front side sliders 74 and a pair of right and left, rear side sliders 75 are provided so as to come in contact with the right and left inclined portions 73 of the track belt 70.

The front side sliders 74 are formed integrally with the first rear swing arms 33 so as to project downwardly, and the rear side sliders 75 are formed integrally with the side rails 35 so as to project downwardly, as illustrated in FIG. 8.

The front and rear side sliders 74 and 75 have the same sectional shape as formed by an extrusion of aluminum. As shown in FIGS. 7 and 8, each side slider 75 (74) is bifurcated to form two laterally projecting ends 76 and 77. The two ends 76 and 77 are connected together by a connecting portion 75a. A resin rail 78 is mounted on each of the two ends 76 and 77 by a bolt 79.

The connecting portion 75a connecting the two ends 76 and 77 is inclined so as to be parallel to the corresponding inclined portion 73 of the track belt 70.

The operation of this preferred embodiment will now be described. The front sliders 74 and the rear sliders 75 are separately provided on the first rear swing arms 33 and the side rails 35, respectively. Accordingly, even when the side rails 35 are moved upwardly in the compressed condition of the cushion spring 63 as shown in FIG. 5, both the front sliders 74 and the rear sliders 75 can be kept in sliding contact with the inner surface of the track belt 70, thus improving the follow-up performance.

Further, since the inclined portions 73 are formed at the laterally opposite end portions of the track belt 70, the vehicle body can be allowed to easily bank and turn.

Each of the sliders 74 and 75 includes the end portion 77 which is adapted to temporarily come into contact with the corresponding inclined portion 73 when it is deformed. Accordingly, even when the inclined portions 73 are deformed, they can be guided by the sliders 74 and 75, so that the track belt 70 can be reliably guided even in a bank condition of the vehicle body.

According to the present invention, the sliders are individually provided on the swing arm and the side rail. Accordingly, even when the swing arm is swung, the side rail connected to the swing arm can follow up the movement of a portion of the track belt between the drive wheel and the first idler, thereby always slidably guiding this portion of the track belt.

In the situation where the laterally opposite end portions of the track belt are formed as the inclined portions, the vehicle body can be allowed to easily bank and turn.

Further, in the situation where each slider has a portion adapted to temporarily come into contact with the corresponding inclined portion when it is deformed, each inclined portion of the track belt can be reliably guided by this portion of each slider in the bank condition of the vehicle body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. In a snowmobile including an endless track device having a drive wheel supported on a vehicle body, a swing arm pivotably supported coaxial with said drive wheel at a front end thereof to said vehicle body, a side rail connected through a shaft to a rear end of said swing arm and extending in a longitudinal direction of said vehicle body, first and second idlers supported to at least a front portion and a rear portion of said side rail, and a track belt wrapped around said first and second idlers and said drive wheel the improvement comprising: sliders for slidably guiding said track belt, said sliders being provided individually on said swing arm and said side rail.

2. The snowmobile according to claim 1, wherein laterally opposite end portions of said track belt are formed as inclined portions inclined so as to gradually be displaced from a snow surface.

3. The snowmobile according to claim 2, wherein there are two side rails and two swing arms, each of said side rails and swing arms having a slider thereon, a sliding portion of each of said sliders relative to said track belt comprises a portion normally kept in sliding contact with a portion of said track belt parallel to the snow surface and adjacent said inclined portions of said track belt and a portion adapted to temporarily come into sliding contact with said inclined portions in a bank condition of said vehicle body.

4. The snowmobile according to claim 2, wherein said sliders include at least one first slider mounted on said swing arm for engaging and guiding said track belt relative to said swing arm and at least one second slider mounted on said side rail for engaging and guiding said track belt relative to said side rail.

5. The snowmobile according to claim 4, wherein said at least one first slider includes two separate sections and further including a bifurcated support for mounting to said swing arm, said bifurcated support includes a first mounting member extending in the longitudinal direction for supporting a first of said two sections of said at least one first slider and a second mounting member extending in the longitudinal direction for supporting a second of said two sections of said at least one first slider, said first section normally kept in sliding contact with a portion of said track belt parallel to the snow surface and adjacent said inclined portions of said track belt, said second section adapted to temporarily come into sliding contact with said inclined portions of said track belt.

6. The snowmobile according to claim 4, wherein said at least one second slider includes two separate sections and further including a bifurcated support for mounting to said side rail, said bifurcated support includes a first mounting member extending in the longitudinal direction for supporting a first of said two sections of said at least one second slider and a second mounting member extending in the longitudinal direction for supporting a second of said two sections of said at least one second slider, said first section normally kept in sliding contact with a portion of said track belt parallel to the snow surface and adjacent said inclined portions of said track belt, said second section adapted to temporarily come into sliding contact with said inclined portions of said track belt.

7. The snowmobile according to claim 5, wherein said track belt includes a first portion which engages said first of said two sections of said at least one first slider and a second portion which selectively engages said second of said two sections of said at least one first slider.

8. The snowmobile according to claim 6, wherein said track belt includes a first portion which engages said first of said two sections of said at least one second slider and a second portion which selectively engages said second of said two sections of said at least one second slider.

9. The snowmobile according to claim 6, and further including a rubber stopper secured to said bifurcated support for transmitting a reaction force from a ground surface through said side rails and directly to a support shaft of at least one of said idlers.

10. The snowmobile according to claim 4, wherein there are two second sliders, one of said two second sliders being mounted on side rails positioned on each side of said snowmobile for engaging and guiding said track belt relative to said side rails and a cross member for spacing said two second sliders a predetermined distance apart.

11. A slider adapted to be used with a snowmobile including a vehicle body with an endless track having a drive wheel supported on the vehicle body, a swing arm pivotably supported at a front end thereof to the vehicle body coaxial with said drive wheel, a side rail connected through a shaft to a rear end of said swing arm and extending in a longitudinal direction of said vehicle body, first and second idlers supported to at least a front portion and a rear portion of said side rail, the endless track being wrapped around said first and second idlers and said drive wheel, and said endless track includes a portion below said drive wheel comprising:

a first slider attachable to said swing arm for slidably guiding said portion of the endless track below the drive wheel; and a second slider attachable to said side rail for slidably guiding said portion of the endless track below the drive wheel.

12. The slider according to claim 11, wherein laterally opposite end portions of said endless track are formed as inclined portions inclined so as to gradually be displaced from a snow surface.

13. The slider according to claim 12, wherein a sliding portion of each of said sliders relative to said endless track comprises a portion normally kept in sliding contact with a portion of said endless track parallel to the snow surface and adjacent said inclined portions of said endless track and a portion adapted to temporarily come into sliding contact with said inclined portions in a bank condition of said vehicle body.

14. The slider according to claim 12, wherein said first slider includes at least one slider mounted on said swing arm for engaging and guiding said endless track relative to said swing arm and said second slider includes at least one slider mounted on said side rail for engaging and guiding said endless track relative to said rail.

15. The slider according to claim 14, wherein said first slider includes two separate sections, and further including a bifurcated support for mounting to said swing arm, said bifurcated support includes a first mounting member extending in the longitudinal direction for supporting a first of said two sections of said first slider and a second mounting member extending in the longitudinal direction for supporting a second of said two sections of said first slider, said first section normally kept in sliding contact with a portion of said endless track parallel to the snow surface and adjacent said inclined portions of said endless track, said second section adapted to temporarily come into sliding contact with said inclined portions of said endless track.

16. The slider according to claim 14, wherein said second slider includes two separate sections and further including a bifurcated support for mounting to said side rail, said bifurcated support includes a first mounting member extending in the longitudinal direction for supporting a first of said two sections of said second slider and a second mounting member extending in the longitudinal direction for supporting a second of said two sections of said second slider, said first section normally kept in sliding contact with a portion of said endless track parallel to the snow surface and adjacent said inclined portions of said endless track, said second section adapted to temporarily come into sliding contact with said inclined portions of said endless track.

17. The slider according to claim 15, wherein said endless track includes a first portion which engages said first of said two sections of said first slider and a second portion which selectively engages said second of said two sections of said first slider.

18. The slider according to claim 16, wherein said endless track includes a first portion which engages said first of said two sections of said second slider and a second portion which selectively engages said second of said two sections of said second slider.

19. The slider according to claim 6, and further including a rubber stopper secured to said bifurcated support for transmitting a reaction force from a ground surface through said side rails and directly to a support shaft of at least one of said idlers.

20. The slider according to claim 14, wherein there are two second sliders, one of said two second sliders being mounted on side rails positioned on each side of said snowmobile for engaging and guiding said endless track relative to said side rails and a cross member for spacing said two second sliders a predetermined distance apart.

* * * * *